United States Patent [19]

Liu

[11] Patent Number: 5,234,226

[45] Date of Patent: Aug. 10, 1993

[54] BABY STROLLER FRONT WHEEL FRAME ASSEMBLY

[76] Inventor: Kun-Hei Liu, 2F., No. 32, Lane 200, Tung Hwa Street, Taipei, Taiwan

[21] Appl. No.: 932,675

[22] Filed: Aug. 20, 1992

[51] Int. Cl.$^5$ .............................................. B62B 7/08
[52] U.S. Cl. .................................... 280/642; 280/650; 280/658; 16/35 R
[58] Field of Search ................... 280/304.1, 288.4, 638, 280/639, 642, 657, 658, 47.34, 47.38; 16/37, 38, 30, 31 A, 35 R, 31 R, 44, 47, 327, 328, 329, 352, 353, 331; 403/154, 155, 289; 446/469, 465, 227, 95

[56] References Cited

U.S. PATENT DOCUMENTS

| | | | |
|---|---|---|---|
| 3,537,125 | 11/1970 | Arenson | 16/31 R |
| 4,608,729 | 9/1986 | Huang | 280/658 |
| 4,690,656 | 9/1987 | Friedman et al. | 446/465 |
| 5,062,178 | 11/1991 | Chiu | 16/30 |
| 5,143,398 | 9/1992 | Teng | 280/642 |

*Primary Examiner*—Richard M. Camby
*Attorney, Agent, or Firm*—Varndell Legal Group

[57] ABSTRACT

A baby stroller front wheel frame assembly includes two front legs connected to two rear legs and holds two front wheel assemblies by two swivel wheel holders. Each front leg is made from a high-impact plastic material through the process of injection molding, having a unitary upright rail on a front end thereof, onto which a swivel wheel holder lock is mounted to lock the respective swivel wheel holder in position. A unitary, hooked, split wheel pin extends downwards from a bottom edge of the second wheel holder adjacent to the upright rail and is tightly fitted into a hole on the respective swivel wheel holder so as to hold it in place. Each swivel wheel holder is made from a high-impact plastic material through the process of injection molding, having two unitary axles aligned on two opposite sides for holding two wheels.

1 Claim, 5 Drawing Sheets

BABY STROLLER FRONT WHEEL FRAME ASSEMBLY

BACKGROUND AND SUMMARY OF THE INVENTION

The present invention relates to a baby stroller front wheel frame assembly which contains a smaller number of parts than the prior art assemblies and which is made from a a high-impact plastic material through the process of injection molding for easy assembly.

A baby stroller front wheel frame assembly according to the prior art illustrated in FIGS. 1 and 2, generally includes of two symmetrical front legs connected to two symmetrical rear Two separate pin holders are respectively connected to the front legs by rivets and washers, and two bushings a respectively inserted into holes on the pin holders. Two two wheel pins are respectively inserted into the bushings to hold two swivel wheel holders, and two swivel wheel holder locks are respectively mounted on the upright rail on the respective pin holder for locking the swivel wheel holders. Two wheel axles are wheel axles respectively inserted through holes on the swivel wheel holders to hold two front wheel assemblies, and a bottom frame is connected between the two symmetrical front legs and the two symmetrical rear legs. A foot-rest frame has the two opposite ends of its top cross rod respectively connected to the two symmetrical front legs, and a foot-rest bracket has two opposite ends respectively connected to the two symmetrical front legs for supporting the foot-rest frame in place. The major parts of this baby stroller front wheel assembly are made from metal through a variety of processing processes including cutting, bending, surface treating and coating. These complicated processing processes make the baby stroller front wheel assembly expensive to manufacture and difficult to assemble. Another disadvantage of this structure for a baby stroller front wheel frame assembly is its weak structural strength. Furthermore, because many parts are used, inventory control becomes complicated.

The present invention eliminates the aforesaid disadvantages. It is therefore an object of the present invention to provide a baby stroller front wheel frame assembly which is easy and convenient to manufacture. It is another object of the present invention to provide a baby stroller front wheel assembly which is easy to assemble and durable in use. It is still another object of the present invention to provide a baby stroller front wheel assembly which is safe in use. According to the present invention, each front leg and the respective pin holder and the respective bushing are integrally made from a high impact plastic material into a solid piece through the process of injection molding; each swivel wheel holder and the respective wheel axle are integrally made from a high impact plastic material into a unitary piece through the process of injection molding. This arrangement greatly reduces the number of parts required for assembling the baby stroller front wheel assembly.

DETAILED DESCRIPTION OF THE PREFERRED EMBODIMENT

Figure 1:
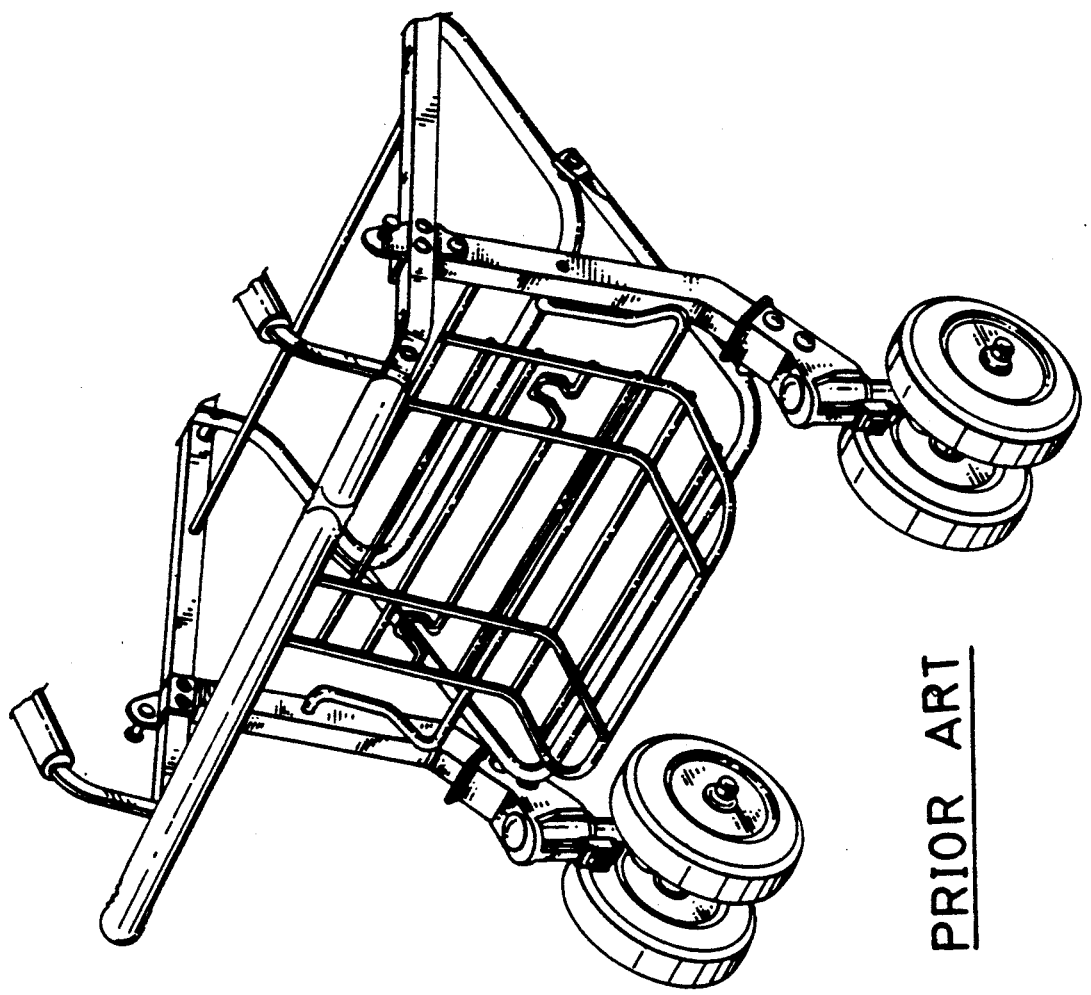
FIG. 1 is an elevational view of the front part of a baby stroller according to the prior art.
Figure 2:
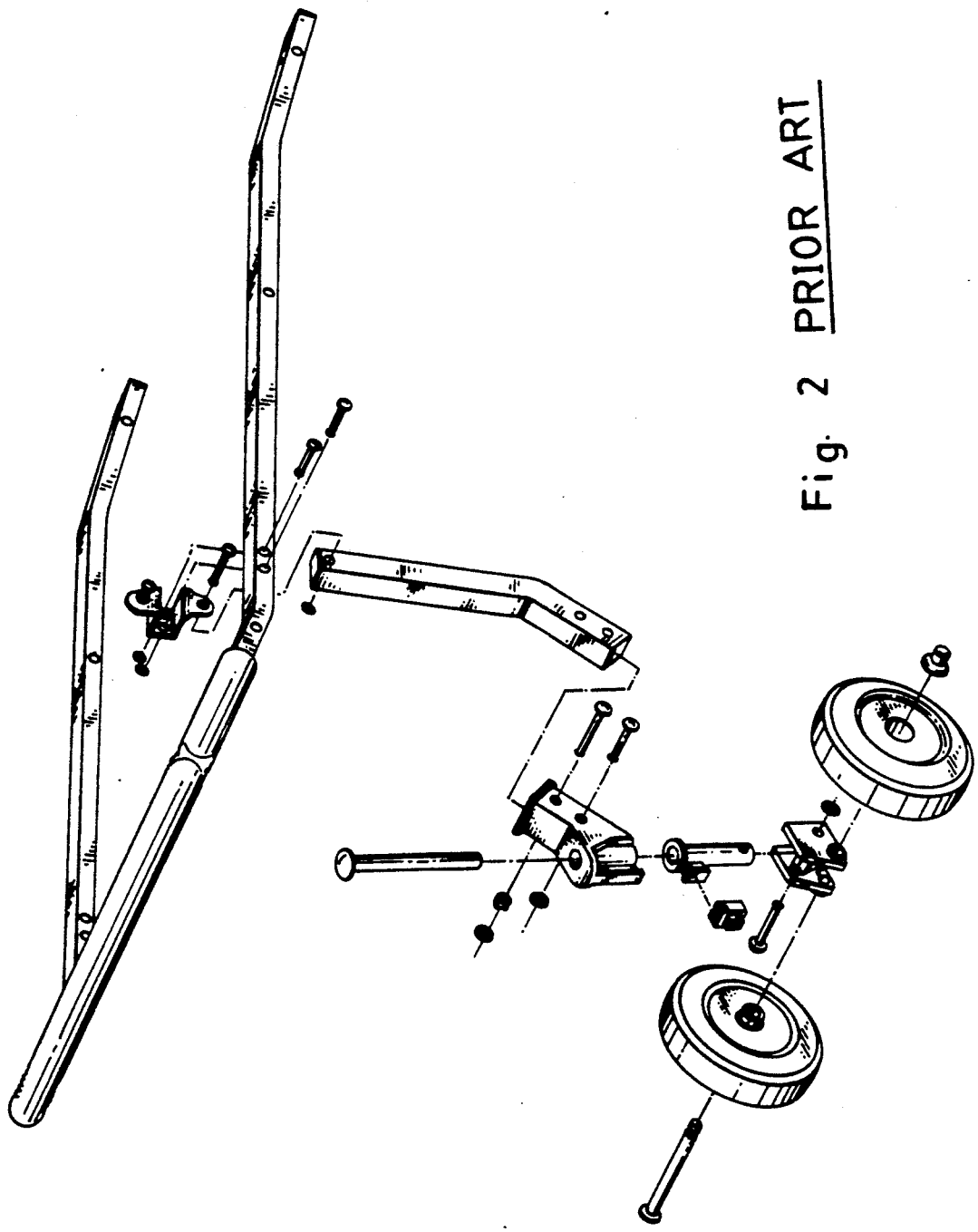
FIG. 2 is an exploded view of a front wheel frame assembly of the baby stroller of FIG. 1.
Figure 3:
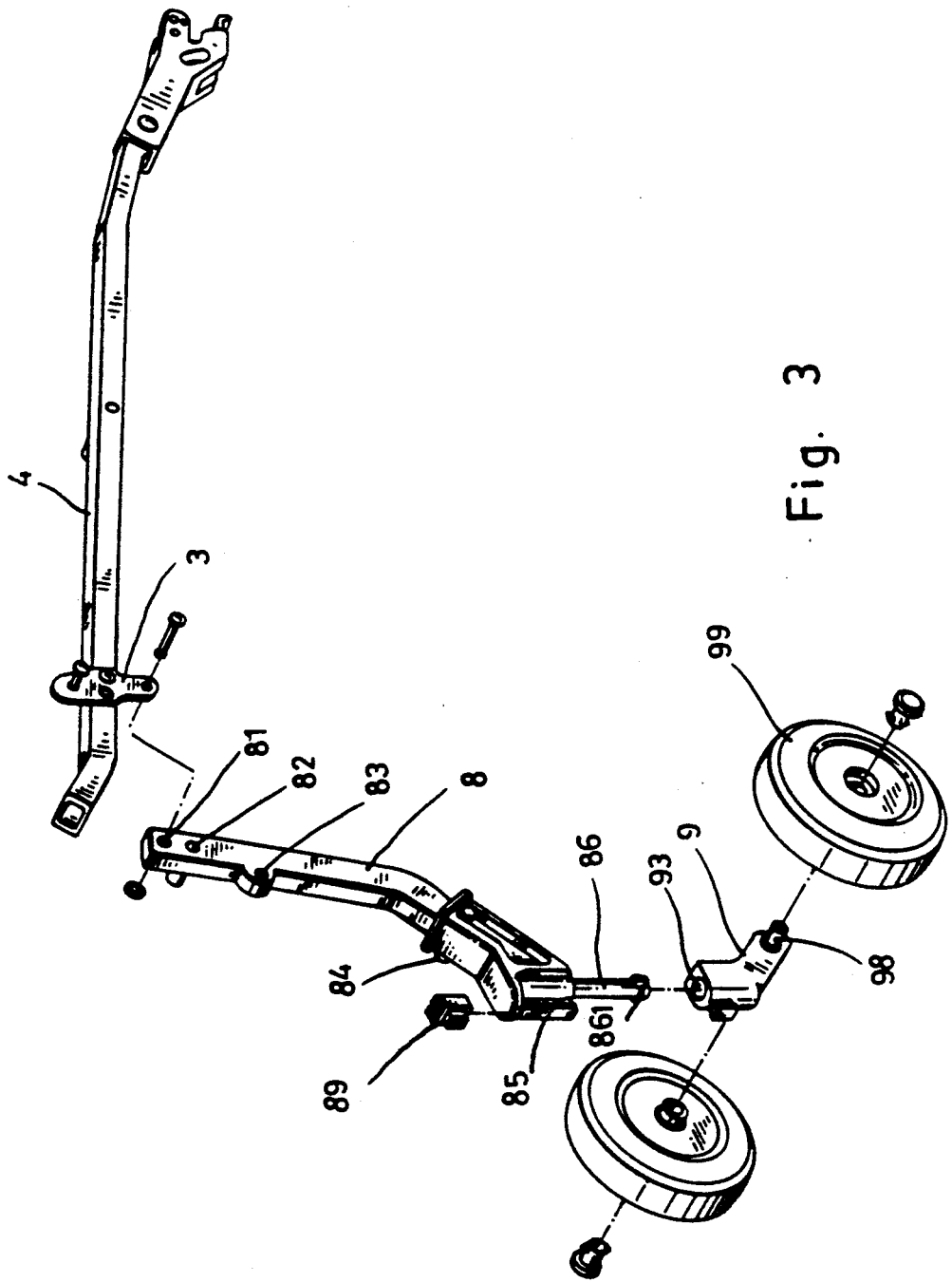
FIG. 3 is an exploded view of a front wheel frame assembly according to the present invention.
Figure 4:
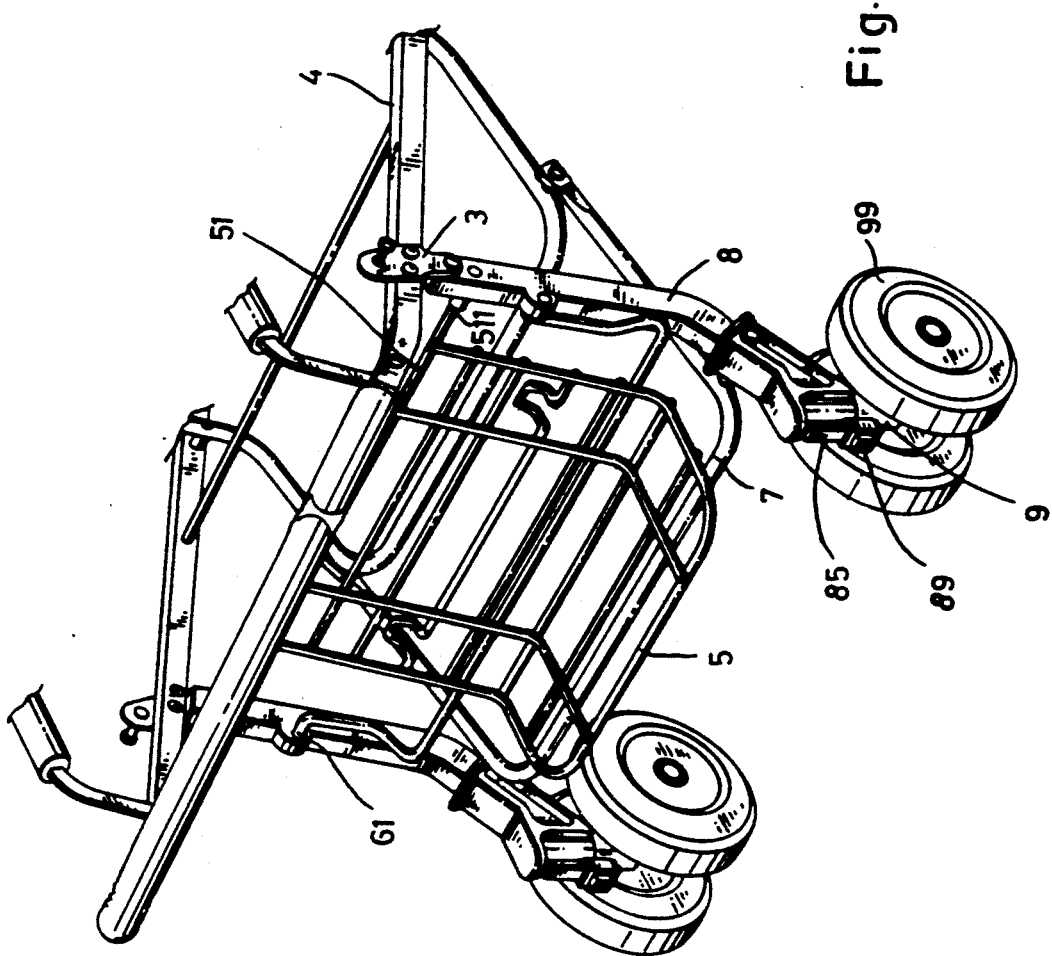
FIG. 4 is an elevational view of the front part of a baby stroller according to the present invention.
Figure 5:
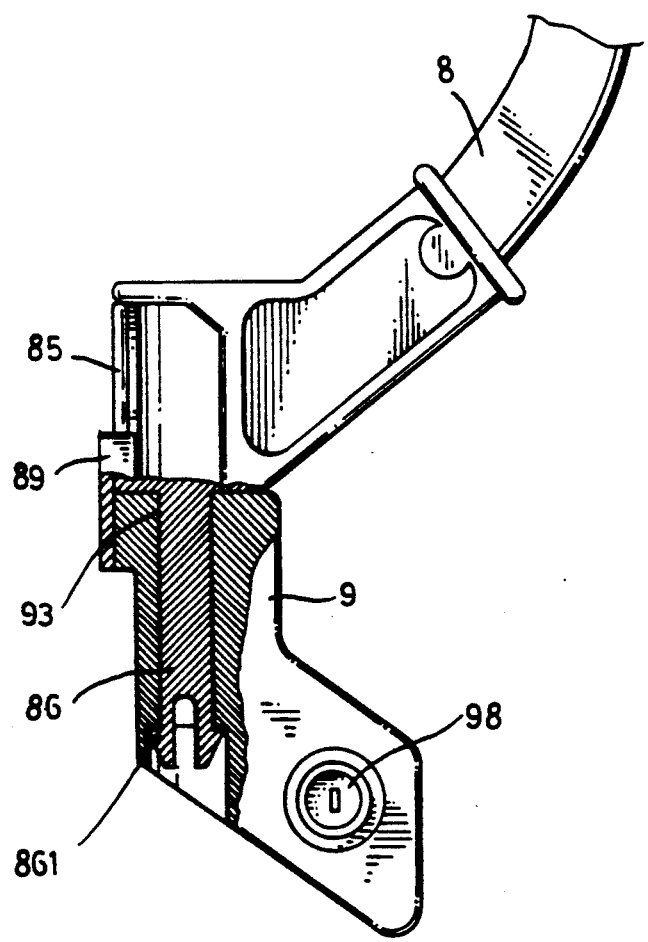
FIG. 5 is a sectional view showing that the wheel pin of the front leg is fitted into the hole on the respective swivel wheel holder to hold it in place.

Referring to FIGS. 3, 4 and 5, a front wheel frame assembly for a baby stroller as constructed in accordance with the present invention is generally comprised of two symmetrical front legs 8 connected to two symmetrical rear legs 4 to hold two symmetrical front wheel assemblies 99 by two swivel wheel holders 9. Each front leg 8 is made from a high-impact plastic material through the process of injection molding, having a first hole 81 adjacent to the top end thereof pivotably connected to the respective rear leg 4 by a connection sheet 3. A second hole 82 below the first hole 81 receives either end 511 of the top cross rod 51 of the foot-rest frame assembly 5, and a third hole 83 below the second hole 82 receives either end 61 of the foot-rest bracket 5. A unitary projecting rod 84 at a suitable location is inserted into a hole (not shown) on the bottom frame 7, and a unitary upright rail 85 is provided on the front end thereof onto which a swivel wheel holder lock 89 is mounted, and a unitary wheel pin 86 extends downwards from the bottom edge thereof adjacent to the upright rail 85 for holding the respective swivel wheel holder 9. The wheel pin 86 has a hooked split bottom end 861 tightly fitted into a hole 93 through the respective swivel wheel holder 9. Each swivel wheel holder 9 is made from a high-impact plastic material through the process of injection molding, having two unitary axles 98 aligned on two opposite sides for holding two wheels 99. Because the legs 8 and the swivel wheel holders 9 are respectively made from a high-impact plastic material through the process of injection molding, a smaller number of parts are required for assembling the front wheel frame assembly of the present invention. This enables the assembly process of the front wheel frame assembly to be simplified.

I claim:

1. A baby stroller front wheel frame assembly which comprises:

two symmetrical front legs respectively connected to two symmetrical rear legs and respectively holding two symmetrical front wheel assemblies by two respective swivel wheel holders, a bottom frame connected between said two symmetrical front legs and said two symmetrical rear legs, a foot-rest frame having a top cross rod connected between said two symmetrical front legs, a foot-rest bracket having two opposite ends respectively connected to said two symmetrical front legs and arranged for supporting said foot-rest frame, each said front leg having a unitary upright rail on a front end of each said front leg and a unitary wheel pin extended downwards from a bottom edge of each said front leg adjacent to said upright rail, each said front leg having an integral construction of a high-impact plastic material including said respective unitary upright rail and said unitary pin, said unitary pin having a shaft and a hooked split bottom end with a larger diameter than of said shaft arranged at a bottom of said shaft, each said swivel wheel holder having an integral structure of a high-impact plastic material including a unitary upright rail on a front end of each said swivel wheel holder, a hole respectively receiving and locking said unitary pin of each said front leg, and two unitary axles aligned on two opposite sides for holding two wheels; said hole having smaller and larger diameter portions, said smaller diameter portion receiving said shaft of said unitary pin and said larger diameter portion receiving said hooked split bottom end of said unitary pin, and a swivel wheel holder lock slidably mounted on said unitary upright rail of said front leg and slidable over said unitary upright rail of said swivel wheel holder for locking said front leg and said swivel wheel holder in position relative to each other.

* * * * *